Dec. 28, 1954  A. G. BUHR  2,698,114
PLANTER VALVE
Filed March 25, 1949  2 Sheets-Sheet 1

Inventor
August G. Buhr
by Louis V. Schiavo
Attorney

Dec. 28, 1954   A. G. BUHR   2,698,114
PLANTER VALVE
Filed March 25, 1949   2 Sheets-Sheet 2
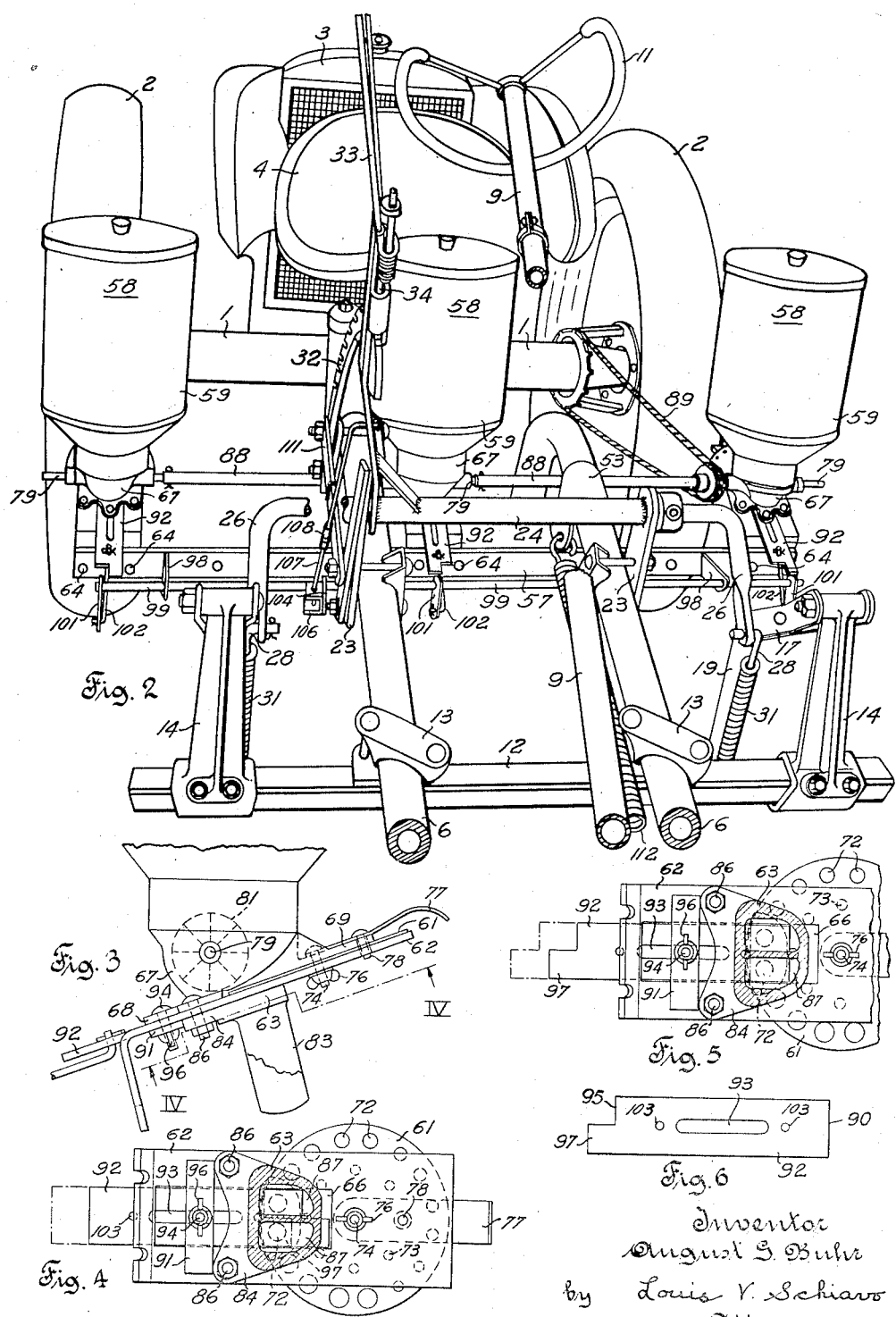
Inventor
August G. Buhr
by Louis V. Schiavo
Attorney

United States Patent Office 2,698,114
Patented Dec. 28, 1954

2,698,114

PLANTER VALVE

August G. Buhr, La Crosse, Wis., assignor to Allis-Chalmers Manufacturing Company, Milwaukee, Wis., a corporation of Delaware Application March 25, 1949, Serial No. 83,365

4 Claims. (Cl. 222—176)

This invention relates generally to seed planting and is more particularly concerned with the provision of an improved seed dispensing control mechanism for planters.

In mechanical seed planting, it has heretofore been common practice to employ a source of seed, such as a hopper having a seed feeding device operatively associated with an opening in the bottom of the hopper, and a valve mechanism controlling the discharge of seed through said opening and through a depending flexible seed receiving and dispensing spout or conduit terminating in a nozzle portion carried by a furrow opening ground rig. Usually the seed feeding device comprises a hopper carried rotatable shaft mounting a toothed or other suitable element disposed in seed feeding relation to the opening in the bottom of the hopper and the valve mechanism comprises an apertured seed plate and a coacting valve plate slidably supported and positionable to cover or uncover an aperture in the seed plate, as desired. In most such arrangements, each hopper is mounted on a tractor or on a wheeled frame structure with its seed feeding shaft disposed at a right angle to the direction of travel, and the furrow opening ground rig (there is usually one such rig for each seed dispensing conduit) is supported on the tractor or on the wheeled frame structure for selected relative vertical movement into a lowered working position or a raised inoperative position. Power for operating the rotatable hopper carried seeder shaft is conveniently derived from a sprocket attached to the rear tractor wheel or to a press wheel or like shaft carried by the ground rig, and if a plurality of hoppers are employed, the seeder shafts of all the hoppers or groups thereof may be axially connected for simultaneous rotation thus minimizing the number of driving sprockets required.

When double feed type hoppers are employed, that is, hoppers each having a pair of separate discharge openings in the bottom thereof and a seed feeding device for each opening mounted on a common shaft, each hopper should be mounted with its discharge openings disposed at a right angle to the direction of travel to thereby position the associated seed dispensing conduits in their most effective relation with respect to the underlying ground rigs, which in turn necessitates positioning a multiple apertured seed plate (that is, a seed plate having two similar series of different sized openings, one series for each hopper discharge opening) for movement in the general direction of travel. In other words, if double feed type hoppers are to be employed and positioned to obtain the most effective seed dispensing action, and if multiple apertured seed plates are employed for handling different sizes of seeds by adjusting the position of the seed plates to place pairs of apertures of selected size in seed receiving relation to the pairs of discharge openings in the bottoms of the hoppers, it is necessary to mount the seed plates for movement in a direction generally at a right angle to the transverse alignment of the hopper discharge openings, that is, at a right angle to the transversely aligned hopper carried seeder shafts. Consequently, if a multiple apertured seed plate is to be effectively controlled by a slidably mounted coacting valve plate, the latter must be movable longitudinally of the seeder shaft, that is, in a direction at a right angle to the direction the seed plate is moved to selectively place different sizes of apertures in seed receiving relation to the hopper discharge openings.

In operating such known arrangements, it is highly desirable to avoid seed waste by incorporating mechanism operative to position the valve plate in covering relation to the effective seed plate apertures in response to a vertical movement of the ground rig to its raised inoperative position. And since these known arrangements necessitate a valve plate movement longitudinally of the seeder shaft in order to terminate seed discharge, the requisite mechanism for effecting such operation in response to a vertical movement of the ground rig usually involves a rather complicated cam and linkage mechanism or some equivalent thereof. In addition, when double feed hoppers are employed and it is desired to plant an odd number of crop rows, it is necessary to either substitute a seed plate having only a single series of different sized apertures for the multiple apertured plate previously used or substitute a single feed hopper for the double feed hopper. Either practice is equally objectionable in that it involves the purchase and use of additional equipment, and in that it is not always convenient to have such additional equipment available for effecting a desired change. Furthermore, there is always the possibility of losing or misplacing such additional equipment thereby incurring further expense through a loss of time and/or replacement of parts.

Therefore, a primary object of the present invention is to provide an improved control valve mechanism for seed planters rendering a double feed hopper readily convertible to a single feed hopper, as desired, simply by changing the position of a single valve element.

Another object of this invention is to provide a control valve mechanism for seed planters incorporating parts constructed and combined for coaction in an improved manner permitting seed discharge controlling movements of a valve element to be effected through a simple linkage responsive to the vertical movement of an associated ground rig.

A further object of the present invention is to provide an improved control valve mechanism for seed planters wherein the same valve element is selectively positionable to effectively control either one or both discharge openings in a double feed hopper and wherein seed discharge controlling movements of the valve element are effected, for any position thereof, through a simple linkage responsive to the vertical movement of an associated ground rig.

And still another object of this invention is to provide a seed planter with an improved control valve mechanism wherein parts are constructed and combined for coaction in a manner affording a simplified and inexpensive construction which can be readily manufactured, assembled, adjusted and/or serviced with a minimum of time, effort and skill.

The foregoing and other objects and advantages inherent in an apparatus embodying the invention will become readily apparent from a consideration of the following disclosure of an illustrative embodiment. And accordingly the present invention may be considered as comprising the various features of construction and/or combination hereinafter more particularly pointed out in the detailed description and appended claims, reference being to the accompanying drawing, in which:

Fig. 2 is a partial perspective view of the rear portion of the apparatus shown in Fig. 1;

Fig. 3 is a fragmentary side elevation of the valve assembly;

Fig. 4 is a sectional view taken along line IV—IV of Fig. 3 looking in the direction of the arrows and showing the end of the valve plate provided with a tang coacting with the seed discharge openings;

Fig. 5 is similar to Fig. 4 but shows the square end of the valve plate coacting with the seed discharge openings; and Fig. 6 is a plan view of the valve plate.

Figure 1:
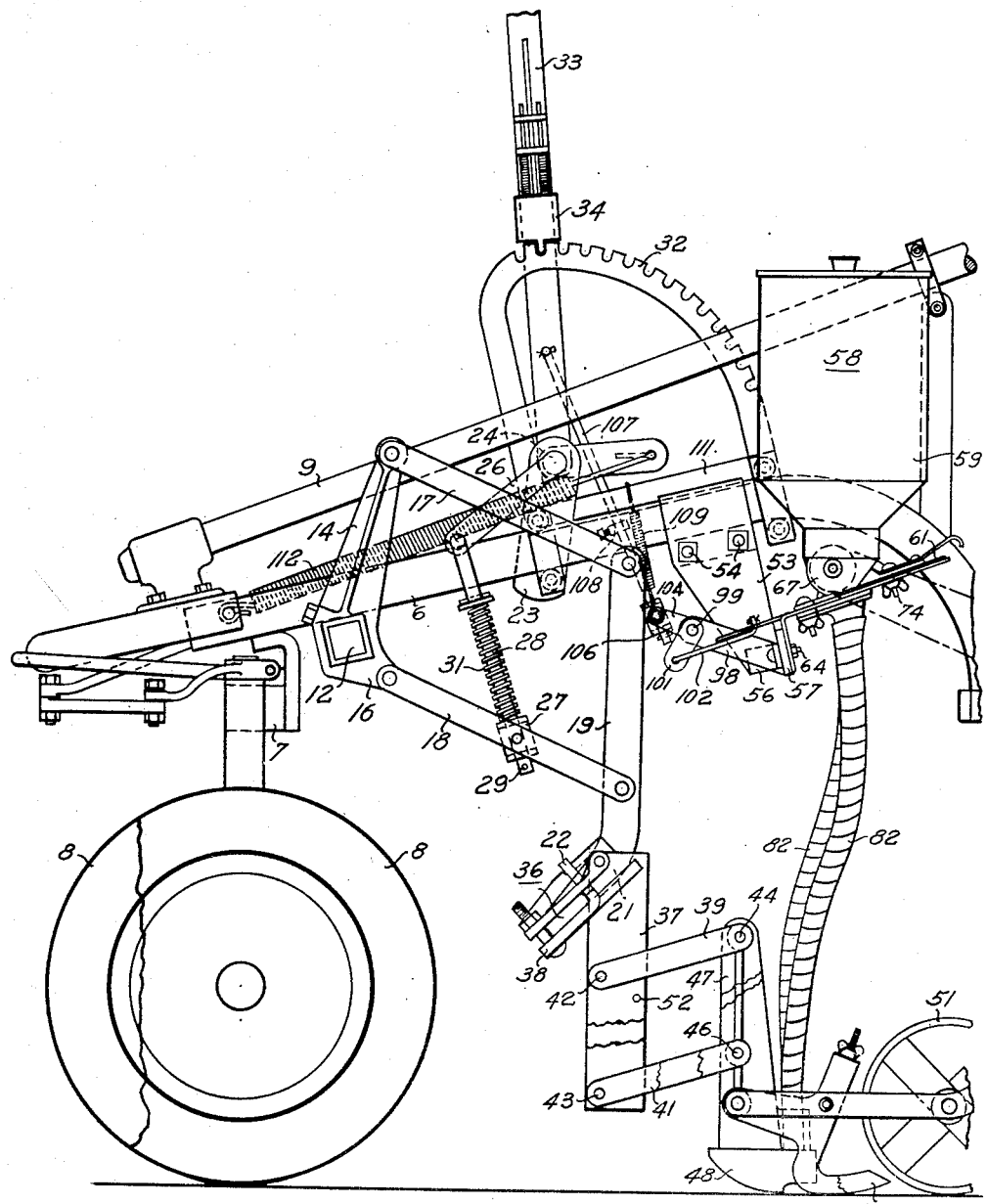
Fig. 1 is a side view of the forward portion of a tractor mounting a seed planter incorporating the invention.

Referring particularly to Figs. 1 and 2, it will be seen that the traveling support or tractor element of the combination includes a rear axle structure 1 mounting a pair of laterally spaced ground engaging traction wheels 2 at opposite ends thereof and mounting a centrally disposed rearwardly extending power unit (of which only the radiator 3 is shown) drivingly connected in a conventional manner with the axle elements mounting the tractor wheels. An operator's seat or station 4 is disposed between the rear traction wheels in elevated relation to axle structure 1 and in forward adjacent relation to the radiator. A pair of laterally spaced tubular frame members 6 have rear end portions thereof rigidly united with a central portion of rear axle structure 1 through means (not shown), these tubular members arching upward abruptly and then extending forward and downward to a supporting front axle structure 7, which in turn is supported on a pair of laterally spaced ground engaging dirigible wheels 8 mounted at opposite ends of the axle structure. The steering mechanism includes a rearwardly extending shaft 9 and a steering wheel 11, which is disposed within easy reach of an operator sitting at his station, and it is to be understood that the tractor is also provided with the usual operator actuated controls (not shown).

A rigid cross bar 12 is secured to the underside of opposed forward portions of tubular frame members 6 by means of suitable clamps 13 and is disposed thereby transversely relative to the direction of travel and immediately to the rear of front axle structure 7. Bar 12 is generally parallel to the transverse front axle structure and preferably projects equal distances to either side of frame members 6. A hanger is secured on each end portion of bar 12, these hangers being similar and each presenting an upwardly extending arm 14 and a depending arm 16. Each upper arm 14 pivotally mounts a rearwardly extending link 17, and each lower arm 16 pivotally mounts a rearwardly extending link 18. The rear ends of the links 17 and 18 are pivotally connected with vertically spaced portions of a rigid vertical link 19, which extends beneath lower link 18 and terminates in a forwardly projecting end portion 21 mounting a clamp means 22 adapted for the reception of a rectangular tool frame bar. It is to be understood that the laterally spaced hangers, one on each side of the tractor, are in transverse alignment relative to the longitudinal axis of the tractor, and that the clamp means 22 depending therefrom are similarly aligned.

A pair of upstanding brackets 23 are secured to opposed portions of frame members 6 in any suitable manner, and a rock shaft 24 is rotatably mounted in the brackets and disposed thereby on the top side of these frame members in generally parallel relation to the front axle structure 7 and bar 12. The opposite end portions of shaft 24 are bent at a right angle to its longitudinal axis so as to form crank or lift arms 26. Each lift arm is positioned in forward and downward extending relation with respect to the longitudinal axis of shaft 24 and generally alongside the inner or tractor side of the adjacent one of the upper links 17. The free end of each lift arm has an operative lost motion connection with an intermediate portion of the adjacent one of the lower links 18, this connection being a well known type comprising a pivot block 27, a lift rod 28 slidably extending through block 27, a pin 29 preventing withdrawal of rod 28 from block 27, and a compression spring 31 surrounding the intermediate portion of rod 28. A notched quadrant 32 and a lever 33 mounting a quadrant engaging latch 34 are operatively associated with shaft 24 for actuating and maintaining it in any selected position to thereby adjust the vertical position of clamp means 22 relative to frame members 6. Preferably the upper portion of lever 33 (not shown) extends rearward to a point within easy reach of an operator seated at station 4, and it should now be obvious that the laterally aligned clamping means 22 constitute a pair of underslung vertically adjustable supports.

An elongated frame structure comprising a rigid draft bar 36, rectangular in transverse cross section, is mounted on aligned supports 22 for movement therewith and is thereby positioned to extend transversely of the tractor in underslung relation thereto. Usually it is desirable to position bar 36 in symmetrical relation relative to the longitudinal axis of the tractor. A plurality of similar ground rigs (any suitable number may be employed) are detachably mounted in laterally spaced relation on spaced portions along the longitudinal axis of draft bar 36. Each rig includes a part 37 detachably secured to draft bar 36 by a clamp means 38, part 37 being disposed thereby in immediate rearward depending relation to the draft bar. A pair of links 39 and 41 have their front end portions connected with vertically spaced pivots 42 and 43, respectively, carried by part 37 and have their rear end portions connected to vertically spaced pivots 44 and 46, respectively, carried by a part 47. The links are of substantially equal length, and the vertical spacing of their points of pivotal connection with parts 37 and 47 are preferably such as to form a parallel linkage. The lower portion of part 47 detachably mounts a ground opener 48 in fixed relation thereto, this ground opener being thereby disposed in lower spaced relation to lower link 41. Two laterally spaced coverer blades 49 and a press or gauge wheel 51 are operatively secured to part 47 and is thereby positioned and maintained in proper working relation to ground opener 48. It should be readily apparent that links 39 and 41 afford a vertical movement of part 47 relative to part 37 and that, conversely, these links afford a vertical movement of draft bar 36 and part 37 relative to part 47. Also, it should be apparent that the extent to which parts 22 and draft bar 36 can be moved vertically upward relative to part 47 is necessarily limited since in order to effectively raise the ground rig or rigs by actuation of lever 33, the support therefor must be capable of picking up and lifting the rig or rigs clear of the ground a sufficient distance practical for all purposes of normal use, including transport purposes. In the construction herein shown this is accomplished by providing part 37 with a projection 52 positioned to engage the underside of link 39 as draft bar 36 and part 37 are moved vertically upward a predetermined distance relative to part 47, it being understood that the connection between part 47, coverer blades 49 and gauge wheel 51 is such that these parts move upward with part 47 when the latter is raised to transport position.

A pair of brackets 53 (of which only one is shown) are supported by opposed intermediate portions of frame members 6 in rearward spaced relation to brackets 23. Each bracket 53 comprises a plate member having a hooked portion disposed over the associated tubular frame member 6 and detachably secured thereto by a pair of bolts 54, which pass beneath the frame member and through opposed portions of the plate member. A pair of angle parts 56 (one for each bracket 53), each having one leg thereof fixedly secured in side abutting relation to a lower portion of a bracket 53, these angle parts being thereby positioned with their free legs disposed to the rear of brackets 53 and in transverse alignment with respect to each other. An elongated hopper support bar 57, generally rectangular in transverse cross section, is detachably secured in side abutting relation to the free legs of angle parts 56, as by means of bolts (not shown). Bar 57 is thereby positioned to extend horizontally transversely of the tractor in underslung relation to the upwardly arched rear portions of frame members 6.

It will be noted that a group of three seed dispensing devices 58, each comprising a seed hopper 59, a seed plate 61, a support or base plate 62, and a spout casting 63, are mounted on bar 57 in transverse alignment and in symmetrical relation with respect to the longitudinal axis of the tractor. These seed dispensing devices are identical, and therefore only one device will be described in the interest of simplicity.

Support or base plate 62 is generally L-shaped and has a short leg detachably secured by a pair of bolts 64 in side abutting relation to a portion of bar 57 provided with a pair of suitably spaced bolt receiving holes. The long or hopper supporting leg of plate 62 extends upward and rearward from the short leg and has an elongated rectangular opening 66 through its extreme forward portion in symmetrical relation to the major medial dimension thereof. Seed hopper 59 is provided with a reduced base portion 67 having a forwardly extending flange 68 and a rearwardly extending flange 69. Flange 68 is adapted to span opening 66 and to abut the top surface of the hopper supporting leg of base plate 62, whereas flange 69 is disposed in spaced superimposed relation to said surface, it being understood that hopper base portion 67 is provided with the usual seed discharge passage therethrough adjacent the rear portion of flange 68. Seed plate 61 is slidably received between flange 69 and the top surface of the hopper supporting leg, this plate being circular and provided with an outer series of pairs of seed discharge openings 72 of different sizes and with an inner group of holes 73 of uniform size, these series being arranged in concentric relation with respect to each other and with respect to the center of plate 61. There is one hole in the inner group for each pair of seed discharge openings of equal size in the outer group, the holes 73 being disposed diametrically opposite a point midway between each pair of seed discharge openings 72. Registering holes in the flange 69, seed plate 61 and the underlying leg of base plate 62 receive a bolt 74 having a winged nut 76 threaded on the end thereof. Bolt 74 affords an axis about which seed plate 61 may rotate when the nut on this bolt is loosened so as to position the seed plate with any selected pair of seed discharge openings 72 registering with the discharge opening in the hopper base portion 67 and with the underlying portion of rectangular opening 66 in the hopper supporting leg. A flat spring latch member 77 has its forward portion secured by bolt 74 to flange 69 and extends rearward therefrom beyond seed plate 61 and beyond the hopper supporting portion of base plate 62 for vertical movement of the free end of this member relative to these plates. A short pin 78 is terminally secured to an intermediate portion of latch member 77 and depends therefrom to be loosely received by underlying pin receiving holes in flange 69 and base plate 62 and by one of the holes 73, the latter being arranged to register with the hole in flange 69 and the hole in base plate 62 as the seed plate is turned. This construction affords means for positioning and retaining a selected pair of seed discharge openings 72 in register with the rear portion of rectangular opening 66.

It will be noted that the base portion 67 of each seed hopper 59 is provided with a seed dispensing mechanism comprising a seeder shaft 79, a seed feeding device 81, and a pair of flexible seed tubes 82 detachably connectable with a pair of spouts 83 depending from spout casting 63. Spout casting 63 is provided with a forwardly extending flange 84 positionable in underside abutting relation to the hopper supporting leg of base plate 62. The forward portion of 84 also spans opening 66 and is positioned directly below hopper base flange 68. The hopper supporting leg of base plate 62, hopper base flange 68 and spout casting flange 84 are provided with registrable openings receiving a pair of bolts 86 for securing these parts together in the relation best shown in Fig. 3. And it should be obvious that seed hopper 59 is secured to base plate 62 principally by bolts 86 and incidentally by bolt 74. Spout casting 63 includes a pair of similar openings 87 (note Figs. 4 and 5) registering with the rear portion of rectangular opening 66 and with the pair of seed discharge openings 72 thereby placing the discharge passage in hopper base portion 67 in communication with the seed spouts 83. The lower ends of seed tubes 82 are also terminally secured in any suitable manner to the ground opening portions 48 of the associated ground rigs, there being one tube so secured to each rig.

The seeder shafts 79 of adjacent hopper structures are similarly mounted and disposed transversely relative to the direction of travel and in end opposed, axial alignment with respect to each other. All of these seeder shafts are coupled together by means of tubular elements 88 and are actuated by a chain and sprocket drive 89 conveniently deriving power from a rear traction wheel. The seed feeding device 81 in each hopper is disposed in operative relation to its seed discharge passage and is rotated by its associated seeder shaft 79.

A bar 91 is secured, as by welding, in transverse abutting relation to the underside of the hopper supporting leg of base plate 62 in forward adjacent relation to spout casting flange 84. A generally rectangular valve plate 92 having the same thickness as base plate 62 and conforming generally with the width of rectangular opening 66 is slidably supported on flange 84 and bar 91 with its side edges abutting the opposite side edges of the rectangular opening. Valve plate 92 extends forward beyond base plate 62 and in overlying relation to and beyond bar 57. Valve plate 92 extends into rectangular opening 66 a distance sufficient to underlie flange 68 and controllably coact with the pair of seed discharge openings 72 selected to place the hopper discharge in communication with the spout casting openings 87. The valve plate is provided with an elongated opening 93 therethrough disposed centrally between and in parallel relation to the side edges thereof. A bolt 94 having a winged nut 96 threaded on the end thereof is received by said elongated opening and by registering holes in flange 68 and bar 91, this bolt acting to retain valve plate 92 in sliding relation with rectangular opening 66. It will be noted that the valve plate 92 has a full width transverse control edge 90 (Fig. 6) at one of its longitudinally opposite end portions, and a reduced width transverse control edge 95 and a reduced width tang member 97 at the other of its longitudinally opposite end portions. By reversing the valve plate 92 end for end either of its longitudinally opposite end portions may be placed in controlling relation to the selected pair of seed discharge openings 72, and in addition this valve plate may be inverted or turned side for side so that the tang 97 is positioned to open and close a selected one of the pair of seed discharge openings.

The reduced width control edge 95 at one of the longitudinally opposite end portions of the valve plate 92 is formed at one side of the latter and the reduced width tang member 97 is formed at the other side of the same end portion. By reversing the valve plate side for side, it may therefore be selectively adjusted to either of two operative positions each presenting said one end portion in controlling relation to both of the seed discharge openings 72. In one of said two operative positions the valve plate 92 is effective, as will be explained more fully hereinbelow, to open or close one of a pair of selected openings 72 by the control edge 95 while the side of the valve plate 92 which has the tang member 97 maintains the other of said openings closed. Similarly, when the valve plate 92 is adjusted to the other of the two mentioned operative positions, it will be effective to open and close said other opening 72 by the control edge 95 while the side of the valve plate 92 which has the tang member 97 maintains said one opening 72 closed.

A plurality of similar brackets 98 (of which only two are shown in Fig. 2) are terminally rigidly secured to spaced portions along support bar 57 and are disposed thereby to project forward therefrom in transverse alignment. A valve plate control shaft 99 is journaled in the forward free end portions of these brackets and is positioned thereby in forward spaced parallel relation to support bar 57. Three throwout arms 101 are terminally rigidly secured to spaced portions along said shaft and depend therefrom in laterally aligned relation to one another, one such arm being disposed opposite each valve plate 92, in forward spaced relation thereto. And the forward end of each valve plate is connected with the free end of the opposite throwout arm 101 by means of a rigid link 102 having end portions bent at right angles to the arm and plate and loosely received in suitable openings therein. To permit end-for-end reversal of valve plate 92, this plate is provided with a pair of similar link receiving openings 103, there being one adjacent each end of the plate. Link 102 is disposed in underlying relation to the valve plate and in general longitudinal alignment therewith. Each link 102 is detachably secured to its associated throwout arm and valve plate by any suitable means, as by the cotter pins shown. An actuating arm 104 is terminally rigidly secured to shaft 99 and is positioned thereby to extend forward generally in longitudinal alignment with lever 33. A U-shaped member 106 is mounted on a free end portion of said actuating arm for pivotal movement about an axis generally parallel to shaft 99, the legs thereof being disposed thereby to extend in parallel relation to this shaft. One end of a rod 107 slidably passes through openings in opposed leg portions of member 106 and extends upward in rearward spaced relation to rock shaft 24, the upper end of this rod being terminally pivotally connected to an intermediate portion of lever 33. A stop member 108 is mounted on an intermediate portion of rod 107 above member 106, and a cotter pin passes through the lower end of this rod in underlying relation to U-shaped member 106. A tension spring 109 is secured to the free end of actuating arm 104 and to a bar 111, which is rigidly associated with frame 6, and is disposed thereby in a generally upright position for urging the actuating arm upward in a clockwise direction as viewed in Fig. 1.

It should now be obvious that when a pair of seed discharge openings 72 has been selected for coaction with the seed dispensing mechanism, the rear end of the spring member 77 is lifted so as to disengage the pin 78 from seed plate 61 and base plate 62, and the bolt 74 is loosened by turning winged nut 76. The seed plate may now be rotated about the axis of bolt 74 until the selected pair of seed discharge openings register with the rear portion of rectangular opening 66, whereupon the spring member is released and pin 78 allowed to reengage the seed plate and base plate, thus latching the seed plate in the selected position. Bolt 74 is then drawn tight again. The chain and sprocket drive 89, deriving power from a rear traction wheel, drives the coupled seeder shafts 79, which actuate the seed feeding device 81 associated with each shaft and arranged for coaction with the selected pair of seed discharge openings 72. The seeds fed through openings 72 are received by the openings 87 of spouts 83 and are conducted to the associated ground rigs by seed tubes 82.

When the lever 33 is in forward position the ground rigs are in operating position and the valve plates 92 are in open position, as shown in Fig. 1. As the operator (with the help of spring 112 mounted in a conventional manner to partially balance the weight of the rigs) draws the said lever backward, rod 107 turns about a horizontal transverse axis afforded by its connection to lever 33 and slidably moves downward through U-shaped member 106, which turns about the axis of its pivotal connection with actuating arm 104. During initial movement of lever 33 the ground rigs move toward inoperative position. The valve plates are not affected until stop 108 bears on U-shaped member 106. Further movement of said lever acts to complete movement of the ground rigs to inoperative position. At the same time actuating arm 104, valve plate control shaft 99, and throwout arms 101, which are all rigidly connected together, rotate (against the pull of spring 109) about the longitudinal axis of shaft 99 and push links 102 rearward for sliding valve plates 92 into closed or rearward limit position. Now, as lever 33 is moved forward, the ground rigs move toward operating position. During the initial part of this movement rod 107 and stop 108 are drawn upward, and the pull of spring 109 causes U-shaped member 106 to immediately follow stop 108, which in turn causes actuating arm 104, valve plate control shaft 99, and throwout arms 101 to rotate about the axis afforded by this shaft and pull links 102 forward for sliding the valve plates 92 into open or forward limit position. Further forward movement of lever 33 acts to draw the stop away from the U-shaped member, and to complete the downward movement of the rigs to operating position. It should be obvious now that the connection between lever 33 and said actuating arm, comprising rod 107, constitutes a lost motion connection. Consequently, the discharge of seeds is not shut off until the ground rigs have been elevated part way. This gives the operator an opportunity to adjust the depth of planting without affecting valve plates 92. It should also be obvious that due to the action of spring 109 the discharge of seeds is resumed almost immediately when the ground rigs begin their descent to operative position. It will be noted, however, that the seeds first discharged reach the ground at approximately the same time as the ground rigs, and that for this reason the number of seeds wasted, if any, is negligible.

If the end of valve plate 92 having the tang 97 is selected for coaction with the selected pair of seed discharge openings 72, the hopper 59 functions as a single feed hopper. When the valve plate 92 is rearwardly disposed (as shown in Fig. 4) both openings are cut off from discharging seeds, and when valve plate 92 is forwardly disposed (as shown by dot-dash lines in Fig. 4), seeds may be discharged from a first one of the selected pair of openings while the tang 97 cuts off the discharge of seeds from the second or other one of these openings. If the valve plate and link 102 are disengaged by removing the cotter pin which detachably secures them together, the tang 97 may, by inverting the valve plate side for side, be positioned to continuously cut off the discharge through the said first of said openings and to control the second or other one of the openings for the discharge of seeds therethrough. Or, by turning the valve plate end for end, the square end of the valve plate may be positioned for coaction with the selected pair of discharge openings 72 (see Fig. 2), in which case seed hopper 59 functions as a double feed hopper, and when the valve plate is in closed position (as shown in Fig. 5) both openings are cut off from the discharge of seeds, and when it is in open position (as shown by dot-dash lines in Fig. 5) both openings are free for the discharge of seeds therethrough. The valve 92 may be considered to be in a first operative position when positioned as shown in Fig. 5, and in a second operative position when the valve is placed as shown in Fig. 4. A third operative position may be obtained by inverting the valve in Fig. 4, side for side.

It should be apparent now that a hopper has been provided which may be utilized either as a double feed hopper or as a single feed hopper by merely changing the position of a single valve plate, and that this makes it possible for the operator to optionally plant an even or an odd number of rows without any necessity for substituting one seed plate for another or one hopper for another, thus eliminating the necessity for keeping extra equipment on hand. It will also be apparent that either one or both discharge openings in a double feed hopper are effectively controlled by selectively positioning the valve plate 92, and that no matter what position is selected for the plate the discharge controlling movements thereof are responsive to the vertical movement of the ground rigs. And, finally, it will be apparent that by arranging for sliding movement of the valve plates in a line normal to the axis of the seeder shafts instead of parallel thereto, a simplified and comparatively inexpensive construction has been achieved which can be readily manufactured, assembled, adjusted and/or serviced with a minimum of time, effort and skill.

It should be obvious that although the apparatus herein disclosed as embodying the invention has particular utility in seed planting, certain features are of more general application and that it is not intended to limit the invention to the exact construction and combinations herein shown and described for purposes of illustration as various modifications within the scope of the appended claims may occur to persons skilled in the art.

It is claimed and desired to secure by Letters Patent:

1. In a mobile seed planter including a hopper structure having a pair of separate openings for the passage of seed therethrough, the improvement comprising an elongated valve element supported in a mounting for reciprocable movement generally in the direction of planter travel between forward and rearward limit positions and having a full width transverse control edge at one of its longitudinally opposite end portions, and a reduced width transverse control edge and a reduced width tang member at the other of its longitudinally opposite end portions, said valve element being selectively positionable in said mounting to present either of said end portions thereof in controlling relation to both of said openings, said full width control edge at said one end portion being shaped to simultaneously open or close both of said openings and said reduced width control edge and tang member at said other end portion being shaped to open or close one of said openings while maintaining the other of said openings closed, and means operable to reciprocate said valve element between said limit positions while presenting either selected end of said valve element in controlling relation to said openings.

2. In a mobile seed planter including a hopper structure having a pair of separate openings for the passage of seed therethrough, the improvement comprising: an elongated valve plate element reciprocably supported in a mounting for movement generally in the direction of planter travel between forward and rearward limit positions and being reversible end for end in said mounting from a first operative position presenting one end of said valve plate element in controlling relation to both of said openings, to a second operative position presenting the other end of said valve plate element in controlling relation to both of said openings, said one end being shaped to simultaneously open and close both of said openings upon reciprocation of said valve plate element in said first operative position thereof and said other end being shaped to open and close one of said openings while maintaining the other of said openings closed upon reciprocation of said element in said second operative position, said valve plate element being reversible side for side in said mounting from said second operative position to a third operative position so that reciprocation of said valve plate element in said third operative position thereof will open and close the other of said openings while maintaining said one opening closed; and means operable to reciprocate said element between said limit positions while presenting either end of said valve element in controlling relation to said openings.

3. In a seed planter including a hopper structure having a pair of seed discharge openings and a rotary seed feeding device rotatably mounted on said hopper structure in seed delivering relation to both of said openings, the improvement comprising: an elongated valve plate element reciprocably supported in a mounting for movement in a direction generally at a right angle to the axis of rotation of said seed feeding device between forward and rearward limit positions and being reversible end for end in said mounting from a first operative position presenting one end of said valve plate element in controlling relation to both of said openings, to a second operative position presenting the other end of said valve plate element in controlling relation to both of said openings, said one end being shaped to simultaneously open and close both of said openings upon reciprocation of said valve plate element in said first operative position thereof and said other end being shaped to open and close one of said openings while maintaining the other of said openings closed upon reciprocation of said element in said second operative position, said valve plate element being reversible side for side in said mounting from said second operative position to a third operative position so that reciprocation of said valve plate element in said third operative position thereof will open and close the other of said openings while maintaining said one opening closed; and means operable to reciprocate said element between said limit positions while presenting either end of said valve element in controlling relation to said openings.

4. In a mobile seed planter including a hopper structure having a pair of separate openings for the passage of seed therethrough, the improvement comprising: an elongated valve element supported in a mounting for reciprocable movement generally in the direction of planter travel between forward and rearward limit positions and being reversible side for side in said mounting for selective adjustment to either of two operative positions each presenting one of the longitudinally opposite end portions of said valve element in controlling relation to both of said openings, said one end portion of said valve element having a reduced width tang member at one side and a reduced width control edge at its other side and being effective in one of said operative positions to open or close one of said openings by said control edge while the side having said tang member maintains the other of said openings closed, and said valve element being effective in the other of said operative positions to open or close said other of said openings by said reduced width control edge while the side having said tang member maintains said one opening closed, and means operable to reciprocate said valve element between said limit positions while said valve element is in one or the other of said operative positions.

References Cited in the file of this patent

UNITED STATES PATENTS

| Number | Name | Date |
|---|---|---|
| 48,432 | Penn et al. | June 27, 1865 |
| 107,975 | Stedman | Oct. 4, 1870 |
| 435,691 | Freeman | Sept. 2, 1890 |
| 966,564 | Koegler | Aug. 9, 1910 |
| 1,197,292 | Hunter | Sept. 5, 1916 |
| 1,703,467 | Allen | Feb. 26, 1929 |
| 2,332,713 | Hand | Oct. 26, 1943 |

FOREIGN PATENTS

| Number | Country | Date |
|---|---|---|
| 24,042 | Great Britain | 1899 |